United States Patent [19]

Hayes et al.

[11] Patent Number: 5,708,792
[45] Date of Patent: Jan. 13, 1998

[54] METHOD AND APPARATUS FOR A COHERENT COPY-BACK BUFFER IN A MULTIPRESSOR COMPUTER SYSTEM

[75] Inventors: Norman M. Hayes, Sunnyvale, Calif.; Adam Malamy, Winchester, Mass.

[73] Assignee: Sun Microsystems, Inc., Mountain View, Calif.

[21] Appl. No.: 681,602

[22] Filed: Jul. 29, 1996

Related U.S. Application Data

[63] Continuation of Ser. No. 376,124, Jan. 19, 1995, abandoned, which is a continuation of Ser. No. 875,668, Apr. 29, 1992, abandoned.

[51] Int. Cl.$^6$ .................................................. G06F 12/08
[52] U.S. Cl. .......................... 395/435; 395/447; 395/470; 395/473; 395/293; 395/299
[58] Field of Search .................................. 395/470, 473, 395/447, 435, 293, 299

[56] References Cited

U.S. PATENT DOCUMENTS

| | | | |
|---|---|---|---|
| 3,949,368 | 4/1976 | West | 395/435 |
| 4,149,239 | 4/1979 | Jenkins et al. | 395/435 |
| 4,567,578 | 1/1986 | Cohen et al. | 395/493 |
| 4,750,154 | 6/1988 | Lefsky et al. | 395/435 |
| 4,928,225 | 5/1990 | McCarthy et al. | 395/472 |
| 5,119,485 | 6/1992 | Ledbetter et al. | 395/473 |
| 5,146,603 | 9/1992 | Frost et al. | 395/470 |
| 5,185,878 | 2/1993 | Baror et al. | 395/450 |
| 5,197,144 | 3/1993 | Edenfield et al. | 395/470 |
| 5,228,134 | 7/1993 | MacWilliams et al. | 395/465 |
| 5,379,394 | 1/1995 | Goto | 395/450 |
| 5,386,579 | 1/1995 | Bourekas et al. | 395/450 |

OTHER PUBLICATIONS

Motorola. MC68030 Enhanced 32-Bit Microprocessor User's Manual Second Edition. Englewood Cliffs, N.J.: Prentice Hall, 1989: 6–1 to 6–7, 1989.
Glass, Brett. "Caching in on Memory Systems." Byte March 1989: 281–285, 1989.

*Primary Examiner*—Eddie P. Chan
*Assistant Examiner*—Reginald G. Bragdon
*Attorney, Agent, or Firm*—Blakely Sokoloff Taylor & Zafman

[57] ABSTRACT

A method and apparatus for maintaining cache coherency in a multiprocessor system having a plurality of processors and a shared main memory. Each of the plurality of processors is coupled to at least one cache unit and a store buffer. The method comprises the steps of writing by a first cache unit to its first store buffer a dirty line when the first cache unit experiences a cache miss; gaining control of the bus by the first cache unit; reading a new line from the share main memory by the first cache unit through the bus; writing the dirty line to the shared main memory if the bus is available to the first cache unit and if not available, the first cache unit checking snooping by a second cache unit from a second processor; comparing an address from the second cache unit with the tag of the dirty line, wherein the tag is stored in content-addressable memory coupled to the store buffer and if there is a hit, then supplying the dirty line to the second cache unit for updating.

8 Claims, 2 Drawing Sheets

METHOD AND APPARATUS FOR A COHERENT COPY-BACK BUFFER IN A MULTIPRESSOR COMPUTER SYSTEM

This is a continuation of application Ser. No. 08/376,124 filed Jan. 19, 1995, abandoned, which is a Continuation of application Ser. No. 07/875,668 filed on Apr. 29, 1992, abandoned.

BACKGROUND OF THE INVENTION

1. Field of the Invention

The present invention relates to memory operations in a multiprocessor computer system and more specifically to cache memory operations in such a system.

2. Art Background

A typical general purpose computer comprises, among other elements, a central processing unit ("CPU") which operates under program instructions to accomplish control, logic, and arithmetic functions; a main memory usually made up of random access memory ("RAM") in which instructions and data are stored for use by the CPU; supplemental long term memory; input/output ("I/O") control apparatus for moving information between the outside world and the computer; and some arrangement for displaying the result of operations such as a display monitor. Computers operate through their CPUs by storing programs (sets of instructions) and data in memory and selectively retrieving those instructions and data to the CPU for manipulation.

It is quite common for a high-speed CPU to have a cache memory in addition to a main memory. The cache memory is smaller but much faster than the main memory. It is placed operationally between the processor and the main memory. During the execution of a program, the cache memory stores the most frequently utilized instructions and data. Whenever the processor needs to access information from the main memory, the processor examines the cache memory first before accessing the main memory. A cache "miss" occurs if the processor cannot find instructions or data in the cache memory and is required to access the slower main memory. Thus, the cache memory reduces the average memory access time of the processor. For further information on cache memories, please refer to "Cache Memories", by Alan J. Smith, *Computing Survey*, Vol. 14, No. 3, September 1982.

When the CPU executes instructions that modify the contents of its current address space, those changes must eventually be reflected in the main memory. There are two general approaches to updating the main memory: "stores" can be immediately transmitted to the main memory (called "write-through" or "store-through"), or stores can initially only modify the cache memory, and it can later be reflected in the main memory ("copy-back"). With respect to main memory traffic, copy-back almost always results in less main memory traffic since write-through requires a main memory access on every store, whereas copy-back only requires a store to the main memory if the swapped-out line, when a cache miss occurs, has been modified.

In a copy-back situation, the information is written only to a block in the cache. The modified cache block is written to main memory only when it is replaced. Copy-back cache blocks can be clean or dirty depending on whether the information in the cache differs from that in lower level memory. To reduce the frequency of copying back blocks on replacement, a feature called a dirty bit is typically used. This dirty bit indicates whether or not the block is modified while in the cache. If it wasn't, the block is not written since the lower level memory has the same information as the cache. With the copy-back, writes can occur at a speed of the cache memory and multiple writes within a block require only one write to the lower level memory. Since every write need not go to the memory, copy-back uses less memory bandwidth, making copy-back attractive in multiprocessor systems.

It is also typical for copy-back to use buffering, where a buffer is required so that the line to be copied back can be held temporarily to avoid interfering with a read by the cache memory. However, a great deal of extra logic may be required if buffering is used. There is not only the logic required to implement the buffers, but also there must be logic to test all memory access addresses and match the addresses against the addresses in the address part of the buffers. That is, there may be accesses to the contents in the store buffers before the data in those buffers has been transferred to the main memory. The copy-back buffer coherency problem is further complicated in a multiprocessor system where each processor along the multiprocessor bus may contain an independent cache while retaining access to the shared main memory.

Typically, when there is a read miss in the cache memory, a new line will have to be fetched from the main memory to replace a line in the cache memory. If the line to be replaced in the cache is dirty, then it is copied to the store buffer and the cache memory will continue to read a line from the main memory through the multiprocessor bus. After the read, the store buffer will write the dirty line back to the main memory (the dirty line being the line that has been modified).

It is quite common for a multiprocessor system to have a retry/relinquish transaction when the write from one store buffer to the main memory does not get executed by the CPU. In such a case the bus control will be relinquished to allow the bus to be used for other tasks. However, there is a cache coherency problem in that the dirty line is still present in the store buffer while another CPU may be accessing a line having the same address in the main memory which has not been updated with a write of the dirty line from the store buffer. As will be described in the following, the present invention discloses a coherent copy-back store buffer for a multiprocessor computer system.

SUMMARY OF THE INVENTION

Therefore, it is an object of the present invention to provide a coherent copy-back buffer during a cache read miss for a cache memory in a multiprocessor computer system.

It is another object of the present invention to achieve cache coherency without complicated additional control logic for each copy-back store buffer in the multiprocessor computer system.

A method and apparatus for maintaining cache coherency in a multiprocessor system having a plurality of processors and a shared main memory coupling through a bus is disclosed. Each of the plurality of processors is coupled to at least one cache unit and a store buffer, where the cache unit comprises a cache memory and its controller. Each of the cache units snoops on the bus for addresses related to write operations to the shared main memory by monitoring the write addresses. The cache unit replaces a dirty line and its tag by first writing the dirty line to the store buffer and second reading a new line from the shared main memory when a cache miss occurs. The dirty line is one which is modified in a cache unit but not yet modified in the shared main memory. The method comprises the steps of writing by a first cache unit to its first store buffer a dirty line when the first cache unit experiences a cache miss; gaining control of the bus by the first cache unit; reading a new line from the shared main memory by the first cache unit through the bus; writing the dirty line to the shared main memory if the bus is available to the first cache unit and if not available, the first cache unit checking snooping by a second cache unit from a second processor; comparing an address from the second cache unit with the tag of the dirty line, wherein the tag is stored in content-addressable memory coupled to the store buffer and if there is a hit, then supplying the dirty line to the second cache unit for updating.

BRIEF DESCRIPTION OF THE DRAWINGS

The objects, features and advantages of the present invention will be apparent from the following detailed description of the preferred embodiment in which.

NOTATION AND NOMENCLATURE

Figure 1:
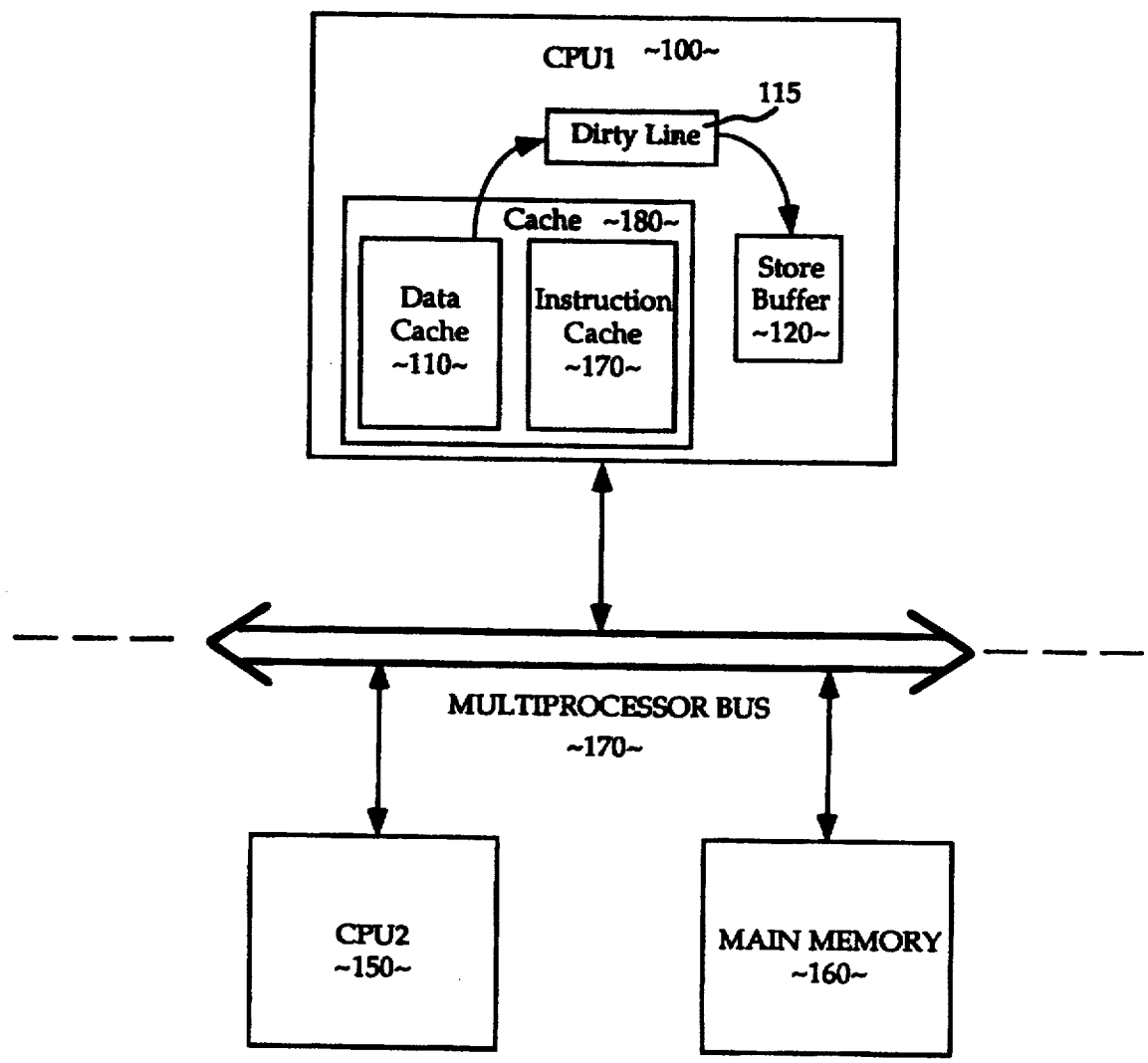
FIG. 1 is a simplified block diagram of a multiprocessor computer system.

The detailed descriptions which follow are presented largely in terms of algorithms and symbolic representations of operations within a computer system. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

CODING DETAILS

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

A method and apparatus for maintaining cache coherency in a copy-back store buffer in a multiprocessor system is disclosed. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

Reference is now made to FIG. 1, where a simplified block diagram of a multiprocessor computer system incorporating the teaching of the present invention is illustrated. Data cache 110 and store buffer 120 are implemented within CPU1 100, which is connected to CPU2 150 and main memory 160 through multiprocessor bus 170. Along with instruction cache 170, data cache 110 is a part of cache 180, and following the sentence ending "bus 170". When a read miss occurs at data cache 110 in CPU1 100, a modified line, i.e. dirty line 115, is produced and is placed into store buffer 120 while data cache 110 goes to main memory 160 to read through multiprocessor bus 170. Only after the read is completed with respect to data cache 110 will the dirty line 115 in store buffer 120 be written to main memory 160 for updating. However, if for some reason the write to main memory 160 is not completed and control of multiprocessor bus 170 is relinquished, as is typically the case in multiprocessor systems when CPU2 150 needs to use multiprocessor bus 170 for some task, there will be a cache coherency problem between the dirty line in the store buffer 120 in CPU1 100 and its corresponding line in main memory 160. A typical multiprocessor system will not be able to handle the retry/relinquish situation and is implemented to prevent such an occurrence by stalling multiprocessor bus 170 for the retry to complete. This is not an efficient use of the bus. However, with the teaching of the present invention, store buffer 120 of CPU1 100 will be able to supply the dirty line to other processors even when main memory 160 does not have the most up-to-date version of the line.

Figure 2:
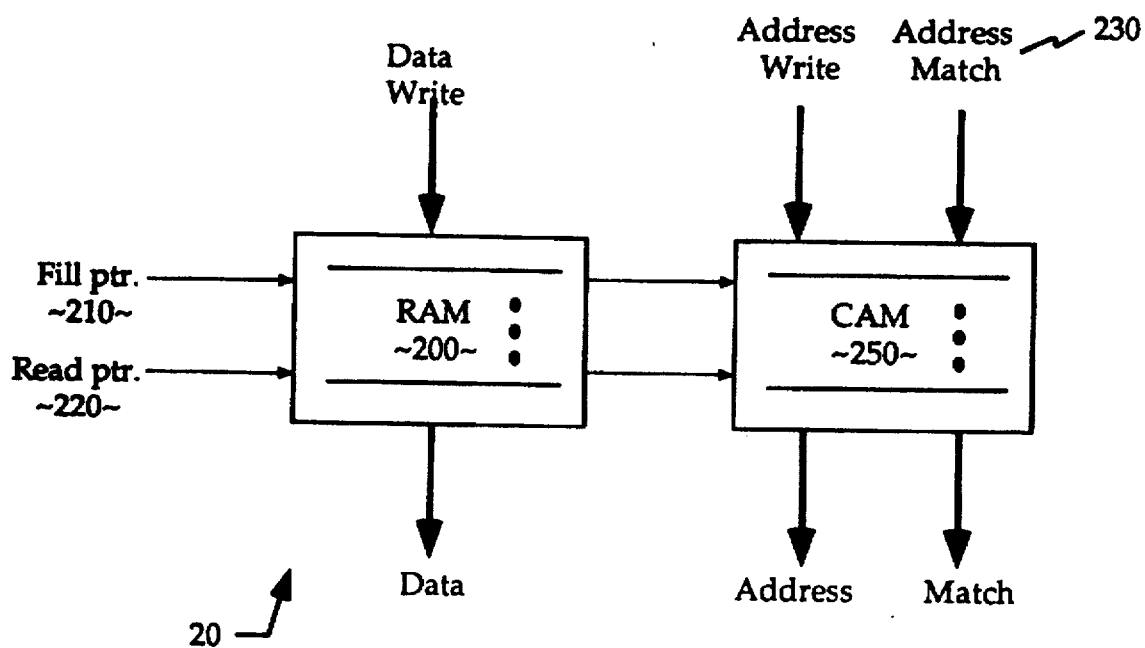
FIG. 2 is a simplified block diagram of a copy-back store buffer of the present invention.

Reference is now made to FIG. 2, where a simplified block diagram of copy-back store buffer 20 of the present invention is illustrated. The store buffer 20 is implemented in RAM 200 with fill pointer 210 and read pointer 220. Implemented in conjunction with the RAM 200 portion of the store buffer 20 is a content-addressable memory ("CAM") 250 for maintaining the tags of the line entries in the RAM 200.

With reference still made to FIG. 2, the operation of copy-back store buffer 20 in a retry/relinquish situation after a read miss in data cache 110 is described as follows. When a write dirty line 115 from store buffer 20 to main memory cannot be completed, a retry is issued. As a result, control of the multiprocessor bus is relinquished such that the multiprocessor bus is not stalled by reasons of efficiency. However, snooping by other cache controllers residing in other CPUs still occurs on a read miss such that all cache controllers check to see if they have a copy of the requested object and take the appropriate action, such as supplying the data to the cache that missed or invalidating their own cache. As such, during every bus transaction cache address tags are checked by snooping. By using the existing CAM 250 associated with each entry of RAM 200 of store buffer 20, other cache controllers can determine whether they have a match with the address of the dirty line in store buffer 20 by comparing the addresses. If a match is found ("match signal" 230), then store buffer 20 from CPU1 will supply the dirty line to the matched CPU after the read miss in a retry/relinquish situation. In a write miss situation, store buffer 120 in CPU1 100 will invalidate the dirty line in its own RAM 200. As such, the other CPU can subsequently write to main memory 160 instead of having CPU1 write to main memory 160 after retry.

As a result, retries on copy-back writes require no special handling by any external arbiter to maintain cache coherency. Furthermore, the store buffer need not write the data back to the data cache for write to main memory which requires complicated control logic.

We claim:

1. A method of maintaining cache coherency in a multiprocessor system, said multiprocessor system having a bus, a plurality of processors coupled to said bus and a shared memory coupled to said bus, each of said plurality of processors being coupled to at least one cache and a store buffer, said cache comprising a cache memory and a controller, said method comprising the steps of:

writing, by a first cache to its first store buffer, a dirty line when said first cache experiences a cache miss, said first cache and said first store buffer being implemented within a first processor, said store buffer including a memory having at least one line and a content-addressable memory configured to store at least one tag corresponding to said at least one line;

gaining control of said bus by said first cache;

reading, by said first cache, a new line from said shared memory;

determining whether said bus is available to said first cache and, if so, writing said dirty line to said shared memory if said bus is unavailable, relinquishing said bus and checking for snooping on said bus by a second cache from a second processor until said bus is available, said snooping on said bus being for addresses related to write operations to said shared main memory, comparing, by said content addressable memory, a snooped address from said second cache with a tag of said dirty line and, if a hit occurs, supplying said dirty line from said first store buffer to said second cache for updating, and said cache retrying said bus, at a later time, to determine its availability and writing said dirty line to said shared memory if said bus is available.

2. A method according to claim 1, further comprising the step of:

flushing said dirty line in said first store buffer if said second cache is subsequently writing said dirty line to said shard main memory.

3. A method according to claim 1, wherein each cache comprises data and instruction cache memories.

4. A method according to claim 3, wherein said cache miss is a data cache read miss by said first processor.

5. A first processor in a multiprocessor system having a bus, a plurality of processors coupled to said bus and a shared memory coupled to said bus, said first processor comprising:

a cache having a cache memory and controller;

a store buffer for storing a plurality of dirty lines, said store buffer having a memory including at least one line, and a content addressable memory configured to store at least one tag corresponding to said at least one line, each dirty line of said plurality of dirty lines being a cache line which is modified in said cache but not yet modified in said shared memory and each said dirty line having a tag, when a cache miss occurs, said cache replacing at least one of said dirty line and its tag by initially writing said dirty line to said store buffer and writing its tag to said content addressable memory of said store buffer and gaining control of said bus and then reading a new line from said shared main memory through said bus, then if said bus is available for writing from said store buffer, said cache writing at least one said dirty line stored in said store buffer to said shared memory, but if said bus is not available, said cache relinquishing said bus and checking for snooping on said bus by a second processor of said plurality of processors until said bus is available, said snooping on said bus being for addresses related to write operations to said shared memory and, if said snooping on said bus occurs, said cache comparing a snooped address with each tag stored in said content-addressable memory and if there is a hit, said cache supplying said dirty line from said first store buffer to said second cache for updating, and said cache retrying, at a later time, said bus to determine its availability and writing said dirty line to said shared memory if said bus is available.

6. A first processor according to claim 5, wherein said cache flushes said dirty line in said store buffer if said second processor subsequently writes said dirty line to said shared memory.

7. An apparatus according to claim 5, wherein said cache comprises data and instruction cache memories.

8. An apparatus according to claim 7, wherein said cache miss is a first cache data read miss.

* * * * *